(12) United States Patent
Yu Chen (10) Patent No.: US 8,956,260 B2
(45) Date of Patent: Feb. 17, 2015

(54) PNEUMATIC MOTOR OF PNEUMATIC PACKING MACHINE

(71) Applicant: Hsiu-Man Yu Chen, Taichung (TW)

(72) Inventor: Hsiu-Man Yu Chen, Taichung (TW)

( * ) Notice: Subject to any disclaimer, the term of this patent is extended or adjusted under 35 U.S.C. 154(b) by 94 days.

(21) Appl. No.: 13/755,323

(22) Filed: Jan. 31, 2013

(65) Prior Publication Data
US 2014/0213403 A1 Jul. 31, 2014

(51) Int. Cl.
*F16H 1/46* (2006.01)
*F16H 3/74* (2006.01)
*E21B 3/00* (2006.01)

(52) U.S. Cl.
USPC .......................................... 475/330; 173/216

(58) Field of Classification Search
USPC .................... 475/330, 903; 173/216
See application file for complete search history.

(56) References Cited

U.S. PATENT DOCUMENTS

| | | | | |
|---|---|---|---|---|
| 3,465,646 A | * | 9/1969 | Kiester et al. | 418/86 |
| 3,507,173 A | * | 4/1970 | Wallace | 81/470 |
| 4,678,045 A | * | 7/1987 | Lyons | 175/61 |
| 4,880,065 A | * | 11/1989 | McDonald et al. | 175/71 |
| 6,076,438 A | * | 6/2000 | Rahm | 81/473 |
| 6,929,074 B1 | * | 8/2005 | Lai | 173/178 |
| 2005/0236170 A1 | * | 10/2005 | Lee | 173/216 |
| 2006/0196684 A1 | * | 9/2006 | Lee | 173/93.5 |
| 2007/0298927 A1 | * | 12/2007 | Hansson | 475/339 |
| 2008/0069652 A1 | * | 3/2008 | Kobayashi | 408/130 |
| 2009/0165600 A1 | * | 7/2009 | Kolodziej et al. | 81/57.11 |
| 2010/0236805 A1 | * | 9/2010 | Saur | 173/216 |
| 2011/0126676 A1 | * | 6/2011 | Chiang | 81/57.11 |
| 2013/0000938 A1 | * | 1/2013 | Matsunaga et al. | 173/181 |

\* cited by examiner

*Primary Examiner* — Roger Pang
(74) *Attorney, Agent, or Firm* — Ming Chow; Sinorica, LLC (57) ABSTRACT

A pneumatic motor mounted on a pneumatic packing machine includes a pneumatic unit. The pneumatic unit is connected with a first planet gear unit. The first planet gear unit is connected with a second planet gear unit. The second planet gear unit is connected with a transmission member. The transmission member is connected to the pneumatic packing machine. Through the first planet gear unit and the second planet gear unit, the pneumatic unit can carry out two-stage deceleration for its output power to enhance the output torque of the transmission member sot that the transmission member can effectively drive the pneumatic packing machine.

3 Claims, 13 Drawing Sheets

PNEUMATIC MOTOR OF PNEUMATIC PACKING MACHINE

BACKGROUND OF THE INVENTION

1. Field of the Invention

The present invention relates to a pneumatic motor of a pneumatic packing machine.

2. Description of the Prior Art

A packing belt is used to pack goods for transportation. When packing the goods, the user will wind the packing belt on the goods. Two free ends of the packing belt are inserted through a packing buckle, and then placed on a pneumatic packing machine. After that, the two free ends of the packing belt are relatively moved through the pneumatic packing machine to tighten the packing belt, and the packing buckle is bound to fix the packing belt so as to pack the goods.

In general, a conventional pneumatic packing machine uses a pneumatic motor as a power source. The pneumatic motor has a housing. The housing has an air inlet hole and an exhaust vent. The housing is pivotally provided with an impeller. The impeller is located between the air inlet hole and the exhaust vent. One end of the impeller is provided with an output shaft. The output shaft extends out of the housing and is connected to the pneumatic packing machine. Thus, when the air enters the housing through the air inlet hole and then flows out of the housing through the exhaust vent, the air will bring the impeller to turn so that the output shaft is turned to drive the pneumatic packing machine to pack the goods.

However, the output shaft is direct driven by the impeller so the torque of the output shaft is low. Thus, the conventional pneumatic motor cannot drive the pneumatic packing machine to tighten the packing belt effectively. The packing belt may loosen sometimes. Accordingly, the inventor of the present invention has devoted himself based on his many years of practical experiences to solve these problems.

SUMMARY OF THE INVENTION

The primary object of the present invention is to provide a pneumatic motor of a pneumatic packing machine. The pneumatic motor is compact and has powerful output torque to drive the pneumatic packing machine effectively to tighten the packing belt firm so that the packing belt won't loosen.

In order to achieve to the aforesaid object, the pneumatic motor of a pneumatic packing machine, comprises a main body, a pneumatic unit, a first planet gear unit, a second planet gear unit, and a transmission member. The main body has a chamber therein. The circumferential side of the main body has an opening, at least one air inlet hole and at least one exhaust vent which communicate with the chamber. The pneumatic unit is disposed in the chamber of the main body. The pneumatic unit comprises a cylinder. The cylinder has a cylinder room therein. The circumferential side of the cylinder has a penetrating hole which communicates with the air inlet hole and the cylinder room and a through hole which communicates with the exhaust vent and the cylinder room. An impeller is pivotally connected in the cylinder room. The impeller has a rotating shaft. One end of the rotating shaft protrudes out of the cylinder room and is provided with a driving toothed portion. The rotating shaft comprises a plurality of blades around a circumferential side thereof. A first planet gear unit is disposed at the opening of the main body. The first planet gear unit comprises a first rotating member. One end of the first rotating member has a first connection trough for insertion of the driving toothed portion of the pneumatic unit, and another end of the first rotating member is provided with a driven toothed portion. The circumferential side of the first rotating member has at least one first through hole which communicates with the first connection trough. The at least one first through hole is pivotally provided with a first gear. The first gear meshes with the driving toothed portion. A first fixing ring is fitted on the first rotating member. The first fixing ring is fixed to the main body. The first fixing ring has a first inner toothed portion on an inner wall thereof. The first inner toothed portion meshes with the first gear. The second planet gear unit is connected to the first planet gear unit. The second planet gear unit comprises a second rotating member. One end of the second rotating member has a second connection trough for insertion of the driven toothed portion of the first rotating member, and another end of the second rotating member has a toothed trough. The circumferential side of the second rotating member has at least one second through hole which communicates with the second connection trough. The at least one second through hole is pivotally provided with a second gear. The second gear meshes with the driven toothed portion. A second fixing ring is fitted on the second rotating member. The second fixing ring is fixed to the first fixing ring. The second fixing ring has a second inner toothed portion on an inner wall thereof. The second inner toothed portion meshes with the second gear. The transmission member is connected to the second planet gear unit. One end of the transmission member has a passive toothed portion. The passive toothed portion is connected to the toothed trough of the second rotating member.

The present invention provides the pneumatic motor of the pneumatic packing machine. The pneumatic unit is connected with the first planet gear unit. The first planet gear unit is connected with the second planet gear unit. The second planet gear unit is connected with the transmission member. The pneumatic motor can carry out two-stage deceleration for the output power of the impeller through the first planet gear unit and the second planet gear unit to enhance the output torque of the transmission member. The transmission member can effectively drive the worm shaft to link the driving shaft to strengthen the driving wheel to pull the packing belt tightly so that the packing belt won't loosen. Because the rotating shaft of the impeller, the driven toothed portion of the first rotating member, the toothed trough of the second rotating member, and the passive toothed portion of the transmission member are coaxial, the size of the pneumatic motor can be reduced greatly.

DETAILED DESCRIPTION OF THE PREFERRED EMBODIMENTS

Embodiments of the present invention will now be described, by way of example only, with reference to the accompanying drawings.

Figure 1:
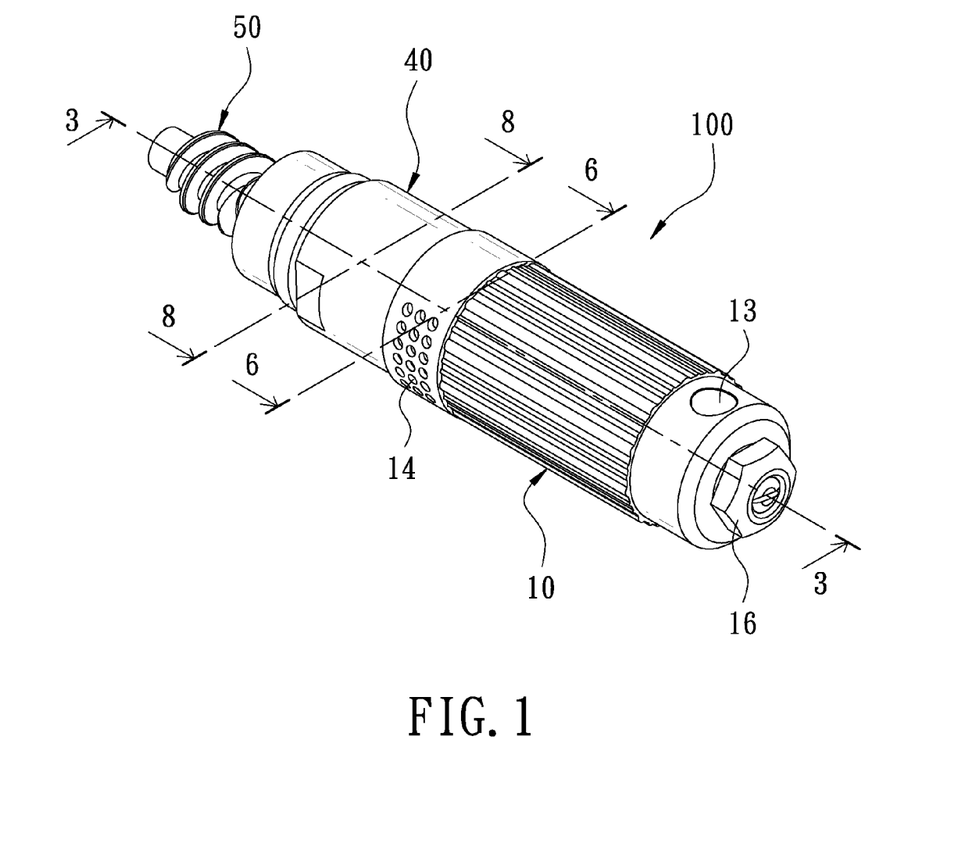
FIG. 1 is a perspective view according to a preferred embodiment of the present invention.
Figure 2:
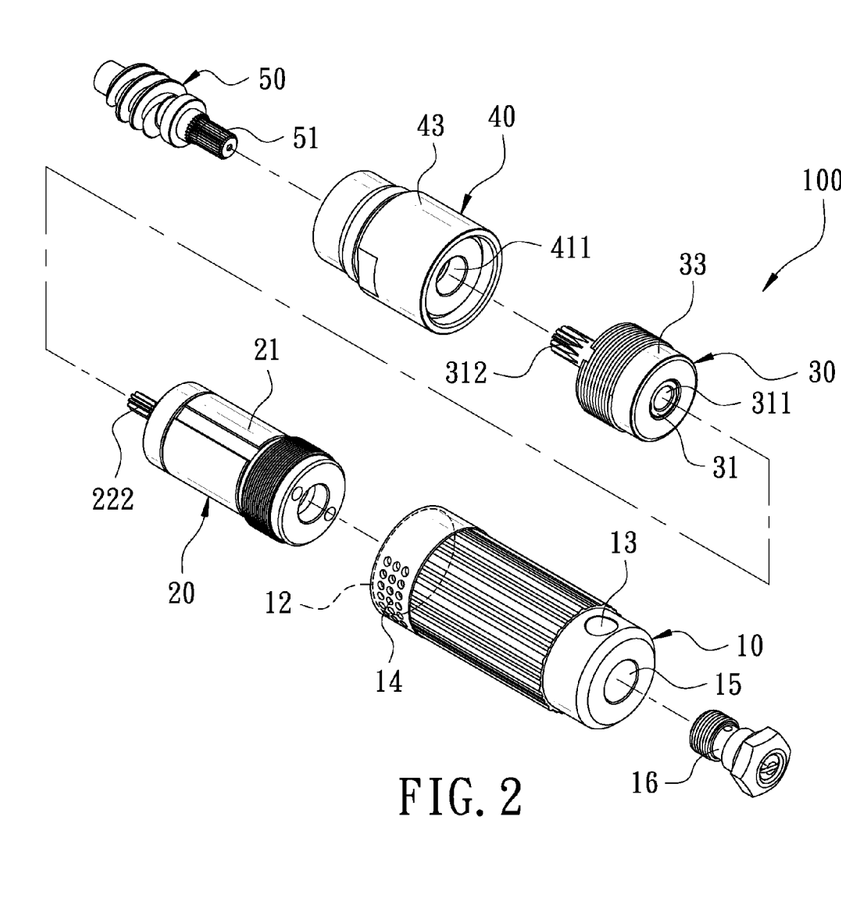
FIG. 2 is an exploded view according to the preferred embodiment of the present invention.
Figure 3:
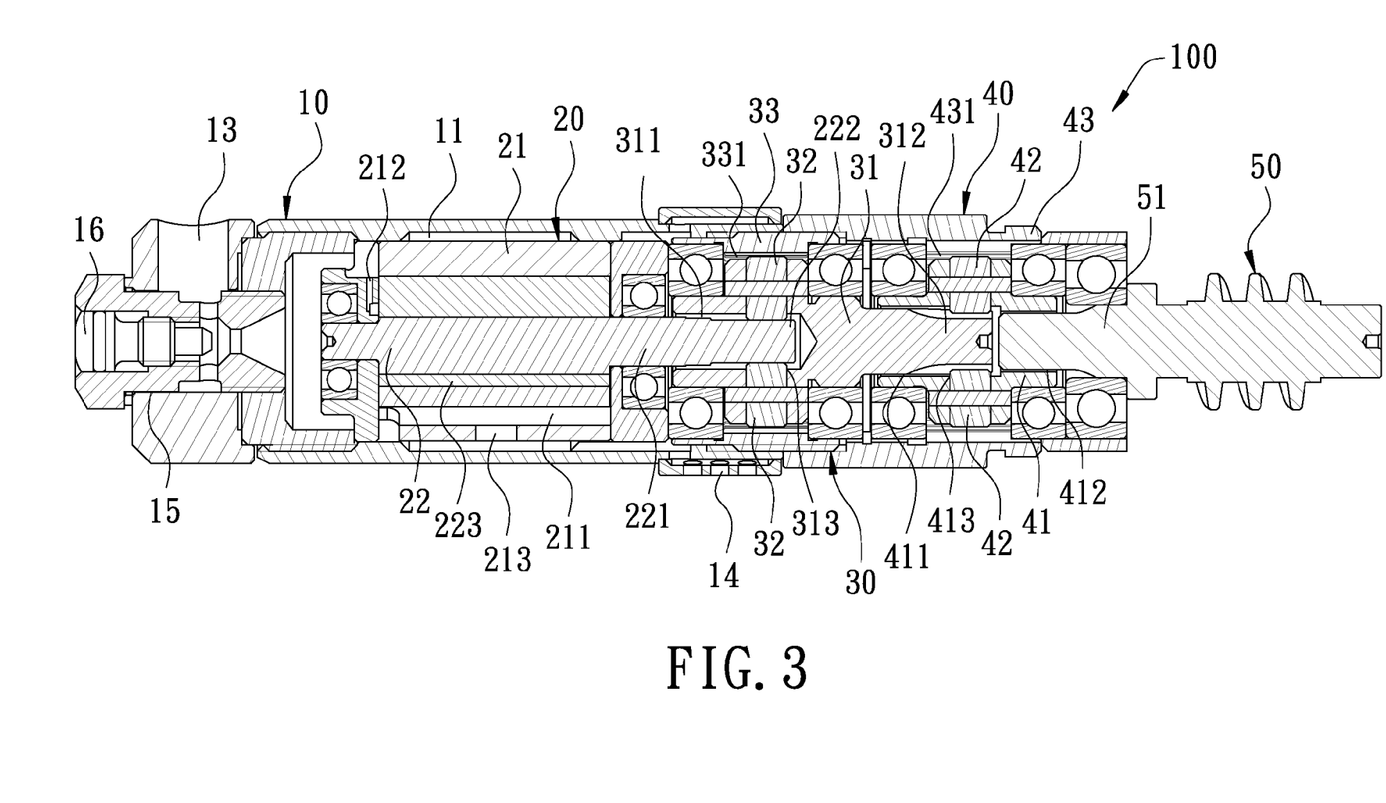
FIG. 3 is a sectional view taken along line 3-3 of FIG. 1.

FIG. 1 is a perspective view according to a preferred embodiment of the present invention. FIG. 2 is an exploded view according to the preferred embodiment of the present invention. FIG. 3 is a sectional view taken along line 3-3 of FIG. 1. The present invention discloses a pneumatic motor 100 of a pneumatic packing machine. The pneumatic motor 100 comprises a main body 10, a pneumatic unit 20, a first planet gear unit 30, a second planet gear unit 40, and a transmission member 50.

The main body 10 has a chamber 11 therein. The circumferential side of the main body 10 has an opening 12, at least one air inlet hole 13 and at least one exhaust vent 14 which communicate with the chamber 11. In this embodiment, the circumferential side of the main body 10 has an air inlet hole 13 and a plurality of exhaust vents 14. The circumferential side of the main body 10 further has an adjustment hole 15 which communicates with the air inlet hole 13. An adjustment bolt 16 is threadedly connected in the adjustment hole 15 so as to adjust the opening of the air inlet hole 13.

Figure 4:
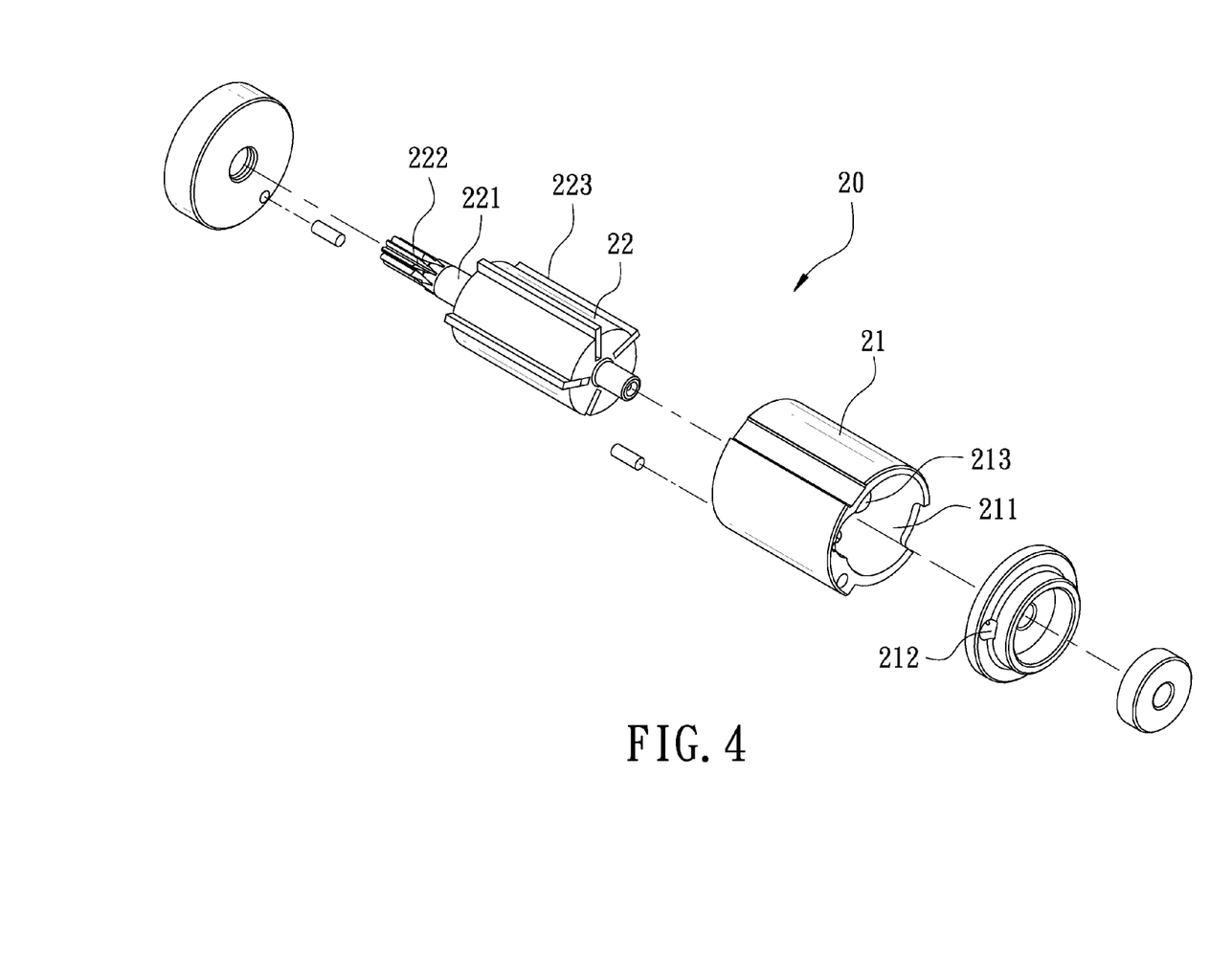
FIG. 4 is an exploded view showing the pneumatic unit according to the preferred embodiment of the present invention.

The pneumatic unit 20 is disposed in the chamber 11 of the main body 10. Referring to FIG. 4, the pneumatic unit 20 comprises a cylinder 21. The cylinder 21 has a cylinder room 211 therein. The circumferential side of the cylinder 21 has a penetrating hole 212 which communicates with the air inlet hole 13 and the cylinder room 211 and a through hole 213 which communicates with the exhaust vents 14 and the cylinder room 211. An impeller 22 is pivotally connected in the cylinder room 22. The impeller 22 has a rotating shaft 221. One end of the rotating shaft 221 protrudes out of the cylinder room 211 and is provided with a driving toothed portion 222. The rotating shaft 221 comprises a plurality of blades 223 around a circumferential side thereof.

Figure 5:
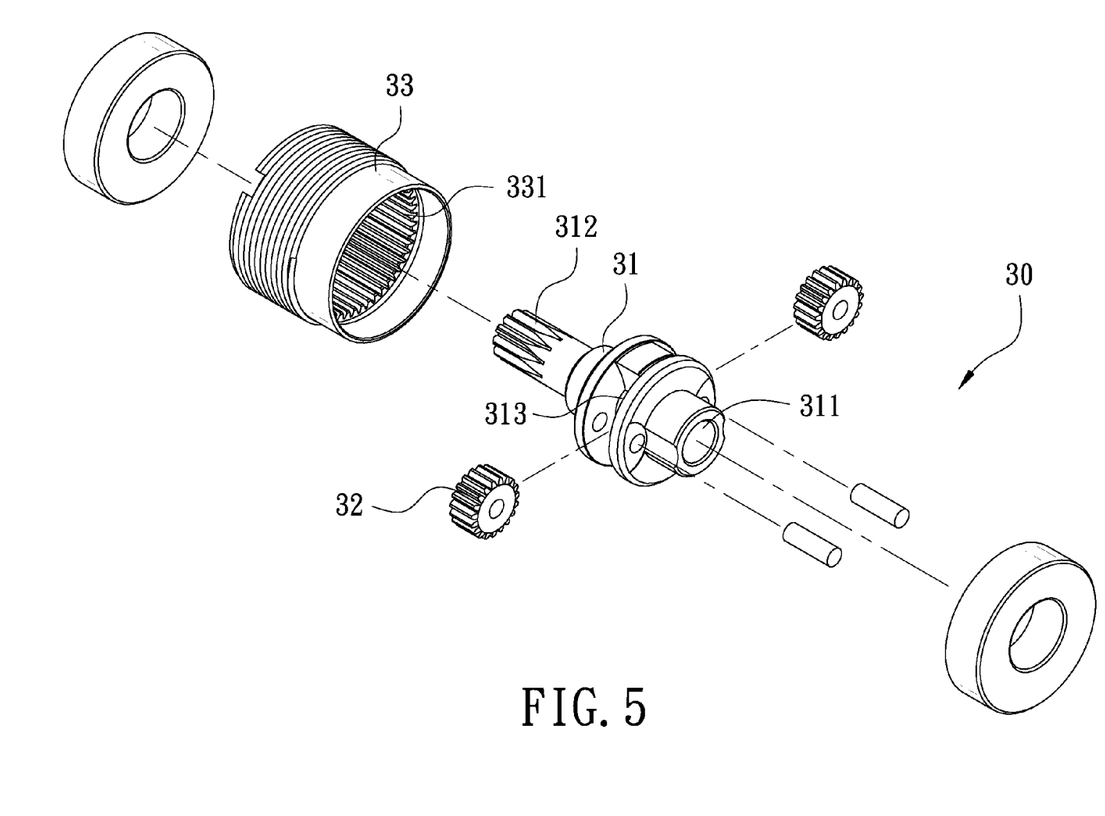
FIG. 5 is an exploded view showing the first planet gear unit according to the preferred embodiment of the present invention.
Figure 6:
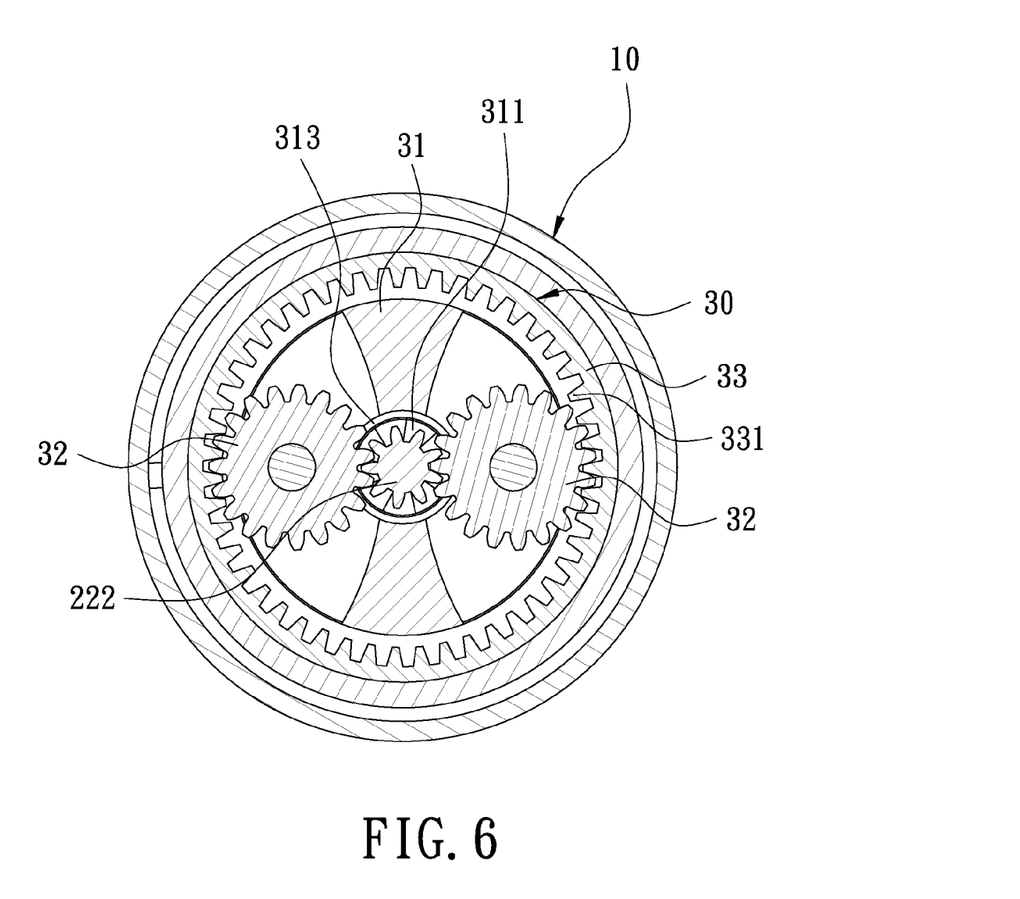
FIG. 6 is a sectional view taken along line 6-6 of FIG. 1.

The first planet gear unit 30 is disposed at the opening 12 of the main body 10. Referring to FIG. 5 and FIG. 6, the first planet gear unit 30 comprises a first rotating member 31. One end of the first rotating member 31 has a first connection trough 311 for insertion of the driving toothed portion 222 of the pneumatic unit 20. Another end of the first rotating member 31 is provided with a driven toothed portion 312. The circumferential side of the first rotating member 31 has at least one first through hole 313 which communicates with the first connection trough 311. In this embodiment, the circumferential side of the first rotating member 31 has a pair of first through holes 313. Each first through hole 313 is pivotally provided with a first gear 32. The first gear 32 meshes with the driving toothed portion 222. A first fixing ring 33 is fitted on the first rotating member 31. The first fixing ring 33 is fixed to the main body 10. The first fixing ring 33 has a first inner toothed portion 331 on an inner wall thereof. The first inner toothed portion 331 meshes with the first gear 32.

Figure 7:
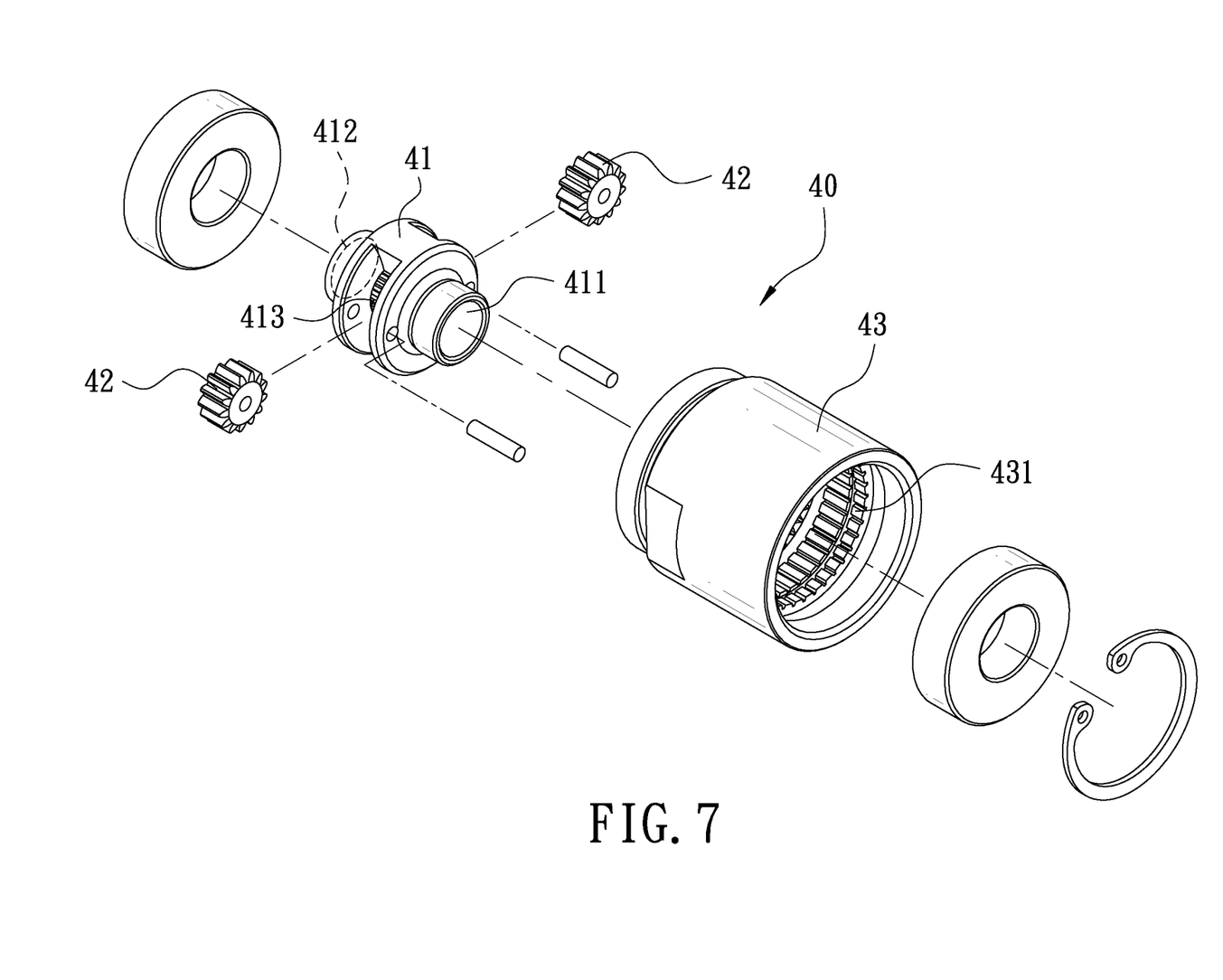
FIG. 7 is an exploded view showing the second planet gear unit according to the preferred embodiment of the present invention.
Figure 8:
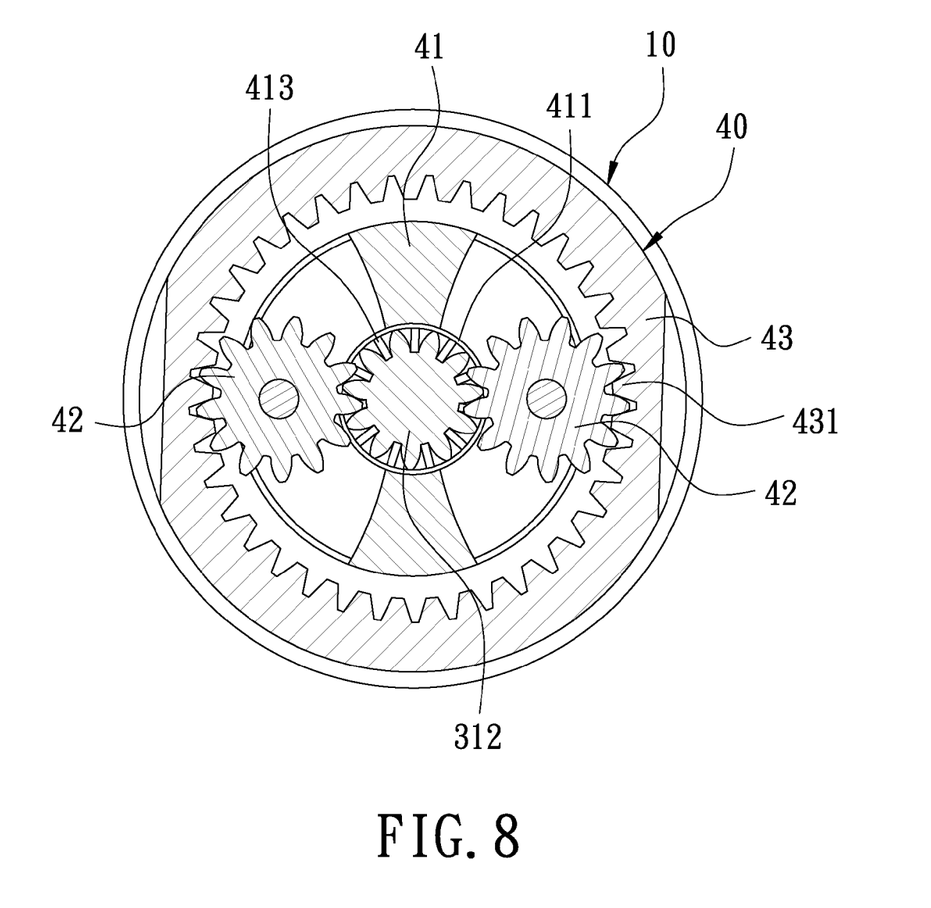
FIG. 8 is a sectional view taken along line 8-8 of FIG. 1.

The second planet gear unit 40 is connected to the first planet gear unit 30. Referring to FIG. 7 and FIG. 8, the second planet gear unit 40 comprises a second rotating member 41. One end of the second rotating member 41 has a second connection trough 411 for insertion of the driven toothed portion 312 of the first rotating member 31. Another end of the second rotating member 41 has a toothed trough 412. The circumferential side of the second rotating member 41 has at least one second through hole 413 which communicates with the second connection trough 411. In this embodiment, the circumferential side of the second rotating member 41 has a pair of second through holes 413. Each second through hole 413 is pivotally provided with a second gear 42. The second gear 42 meshes with the driven toothed portion 312. A second fixing ring 43 is fitted on the second rotating member 41. The second fixing ring 43 is fixed to the first fixing ring 33. The second fixing ring 43 has a second inner toothed portion 431 on an inner wall thereof. The second inner toothed portion 431 meshes with the second gear 42.

The transmission member 50 is connected to the second planet gear unit 40. In this embodiment, the transmission member 50 is a worm shaft. One end of the transmission member 50 has a passive toothed portion 51. The passive toothed portion 51 is connected to the toothed trough 412 of the second rotating member 41.

Figure 9:
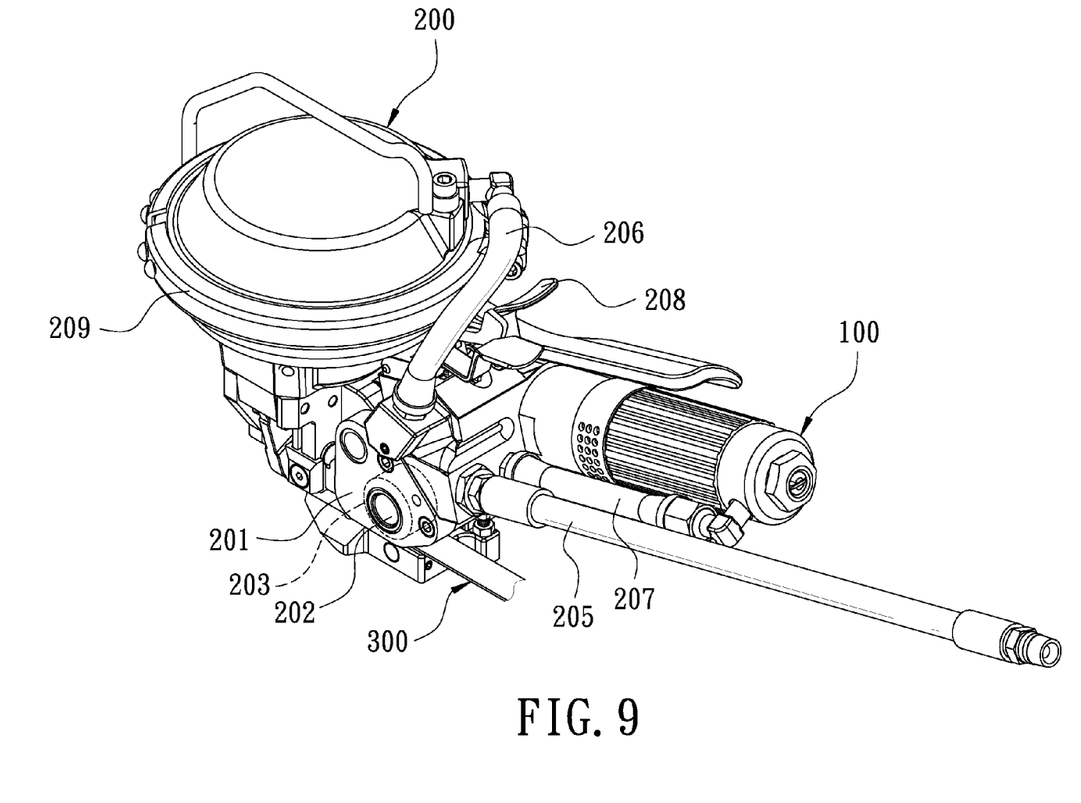
FIG. 9 is a perspective view of the preferred embodiment of the present invention when in use.
Figure 10:
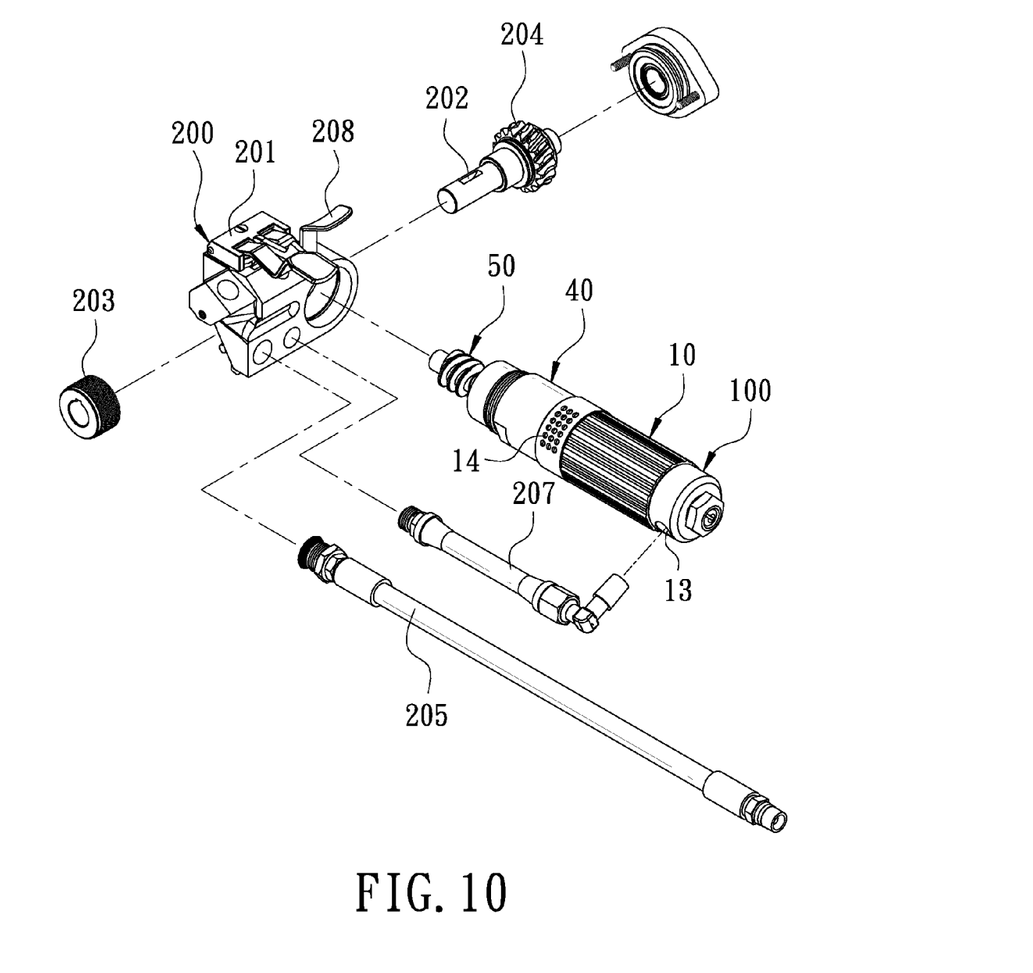
FIG. 10 is an exploded view of the preferred embodiment of the present invention when in use.

FIG. 9 is a perspective view of the preferred embodiment of the present invention when in use. FIG. 10 is an exploded view of the preferred embodiment of the present invention when in use. The pneumatic motor 100 is mounted to a pneumatic packing machine 200. Wherein, the pneumatic packing machine 200 comprises a valve seat 201. The valve seat 201 is pivotally provided with a driving shaft 202. One end of the driving shaft 202 is connected with a driving wheel 203, and another end of the driving shaft 202 is connected with a worm shaft 204. The valve seat 201 is further connected with an air inlet pipe 205, a first air supply pipe 206, and a second air supply pipe 207. The valve seat 202 further comprises a button member 208 to control the air from the air inlet pipe 205 to flow to the first air supply pipe 206 or the second air supply pipe 207. The pneumatic packing machine 200 further comprises a packing mechanism 209. The packing mechanism 209 is connected to the first air supply pipe 206 and driven by the air for packing operation with a packing belt 300. The pneumatic motor 100 is mounted to the valve seat 201. The transmission member 50 is connected to the worm shaft 204. The second air supply pipe 207 is connected to the air inlet hole 13 of the main body 10. The transmission member 50 is driven by the air to turn and link the driving shaft 202 to turn, so that the driving wheel 203 is driven to bring the packing belt 300 to move toward the packing mechanism 209.

Figure 11:
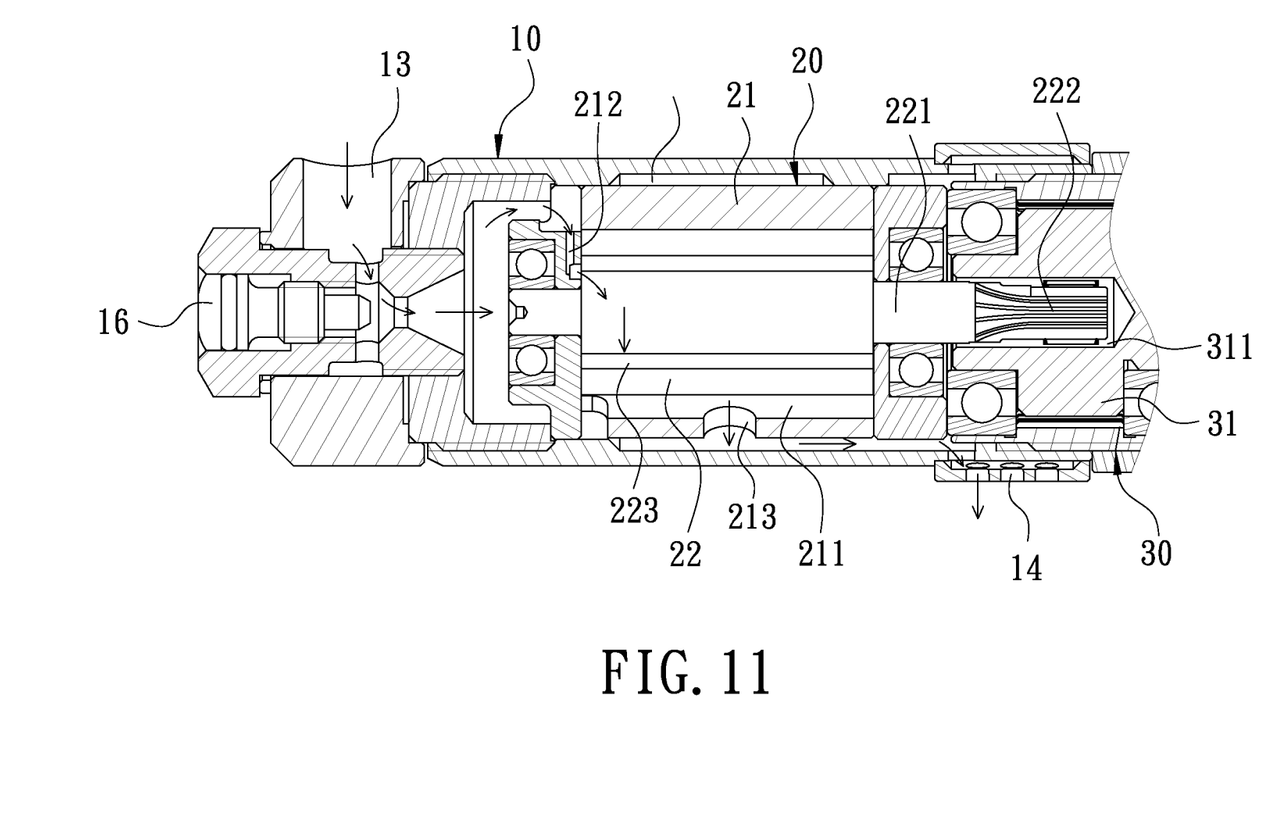
FIG. 11 is a schematic view showing the impeller pushed by the air according to the preferred embodiment of the present invention.

FIG. 11 is a schematic view showing the operation of the preferred embodiment of the present invention. When the air flows to the pneumatic motor 100 through the second air supply pipe 207, the air will enter the cylinder room 211 through the air inlet 13 and the penetrating hole 212 to the through hole 213 and then exhaust through the exhaust vents 14. When the air passes the cylinder room 211, the air will push the blades 223 to turn the impeller 22 about the rotating shaft 221.

Figure 12:
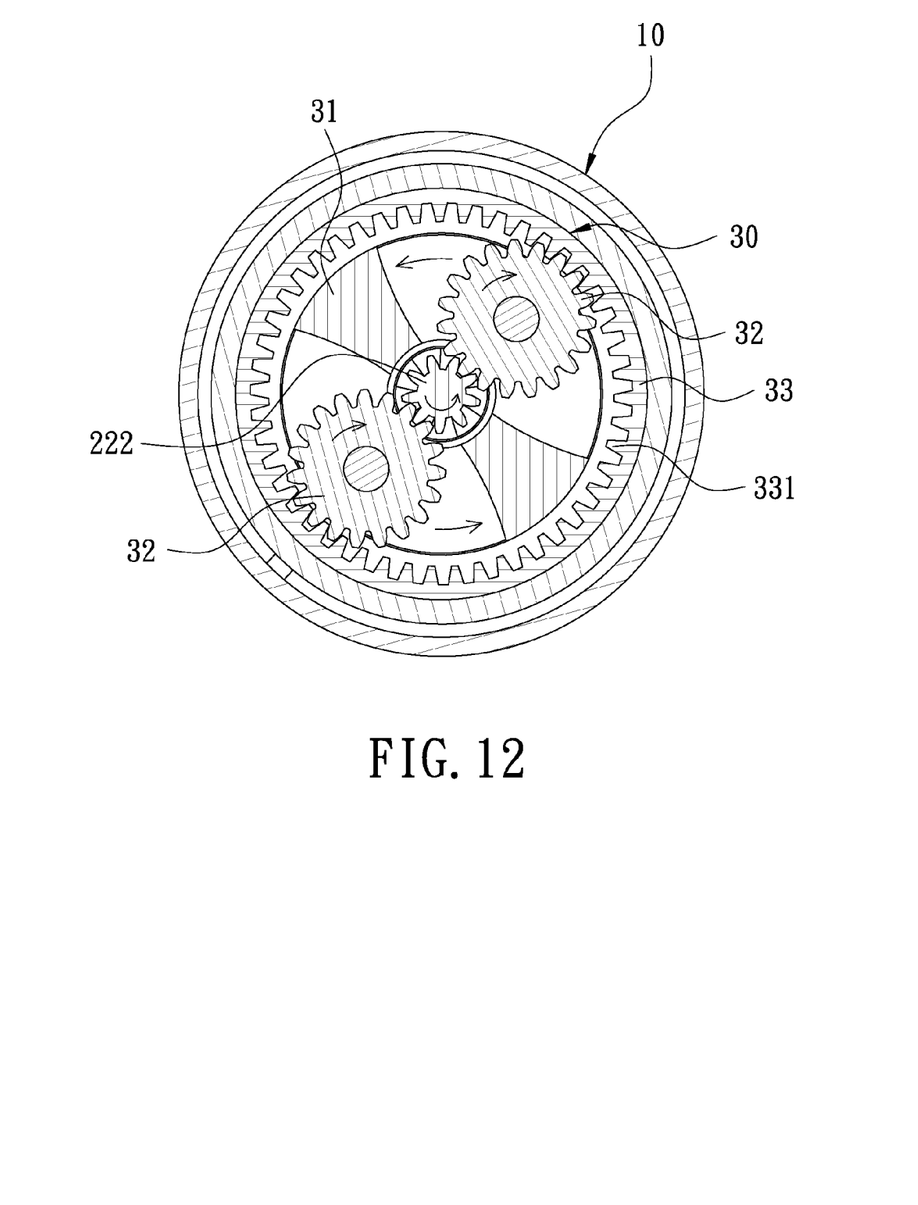
FIG. 12 is a schematic view showing the first planet gear unit in a turning state of the preferred embodiment of the present invention.

FIG. 12 is another schematic view showing the operation of the preferred embodiment of the present invention. When the impeller 22 starts to turn, the first fixing ring 33 is fixed to the main body 10 so it is unable to turn. The driving toothed portion 222 of the impeller 22 will link the first gears 32 of the first planet gear unit 30 to turn simultaneously, such that the first gears 32 move along the first inner toothed portion 331 of the first fixing ring 33 to link the first rotating member 31 to turn coaxially with the rotating shaft 221 of the impeller 22. It is noted that the number of the teeth of the first rotating member 31 is equal to the number of the teeth of the driving toothed portion 22 plus the number of the teeth of the first inner toothed portion 331 in accordance with the operating theory of a gear wheel, so that the drive ratio of the first rotating member 31 and the driving toothed portion 222 is greater than 1. The rotational speed of the first rotating member 31 is lower than that of the rotating shaft 221, but the torque of the first rotating member 31 is higher than that of the rotating shaft 221.

Figure 13:
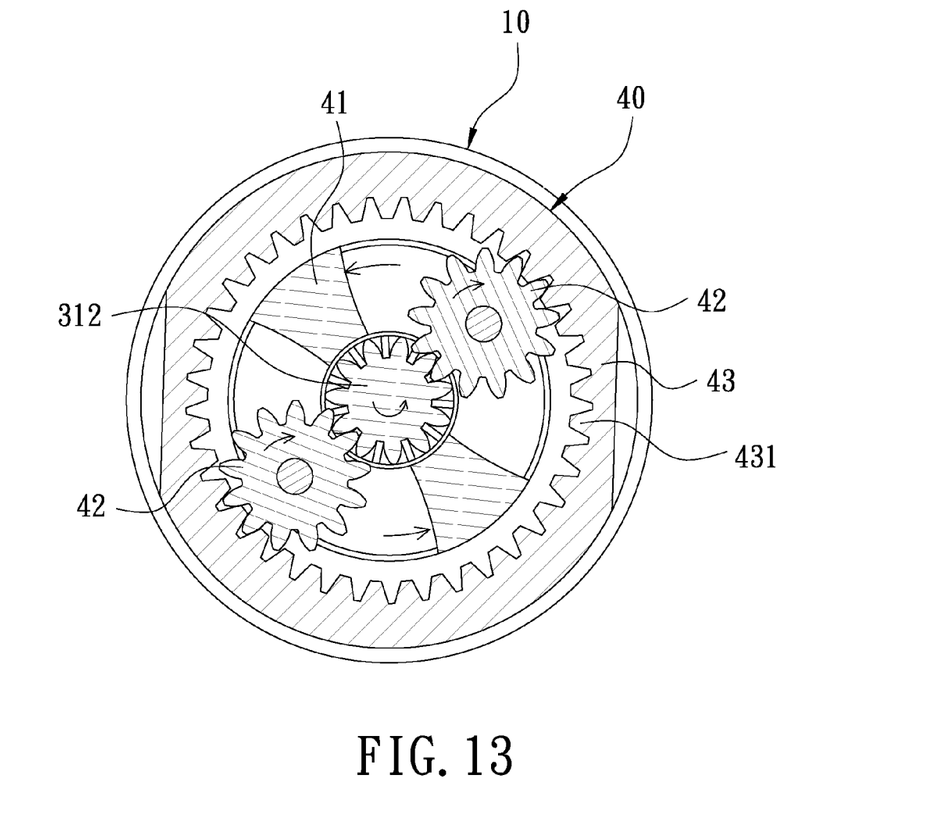
FIG. 13 is a schematic view showing the second planet gear unit in a turning state of the preferred embodiment of the present invention.

FIG. 13 is a further schematic view showing the operation of the preferred embodiment of the present invention. When the first rotating member 31 starts to turn, the second fixing ring 43 is fixed to the first fixing ring 33 so it is unable to turn. The driven toothed portion 312 of the first rotating member 31 will link the second gears 42 of the second planet gear unit 40 to turn simultaneously, such that the second gears 42 move along the second inner toothed portion 431 of the second fixing ring 43 to link the second rotating member 41 to turn coaxially with the first rotating member 31 and further to turn the transmission member 50 to drive the worm shaft 204 of the pneumatic packing machine 200. It is noted that the number of the teeth of the second rotating member 41 is equal to the number of the teeth of the driven toothed portion 312 plus the number of the teeth of the second inner toothed portion 431 in accordance with the operating theory of a gear wheel, so that the drive ratio of the second rotating member 41 and the driven toothed portion 312 is greater than 1. The rotational speed of the second rotating member 41 is lower than that of the first rotating member 31, but the torque of the second rotating member 41 is higher than that of the first rotating member 31.

Accordingly, the pneumatic motor 100 can carry out two-stage deceleration for the output power of the impeller 22 through the first planet gear unit 30 and the second planet gear unit 40 to enhance the output torque of the transmission member 50. The transmission member 50 can effectively drive the worm shaft 204 to link the driving shaft 202 to strengthen the driving wheel 203 to pull the packing belt 300 tightly so that the packing belt 200 won't loosen. Because the rotating shaft 221 of the impeller 22, the driven toothed portion 312 of the first rotating member 31, the toothed trough 412 of the second rotating member 41, and the passive toothed portion 51 of the transmission member 50 are coaxial, the size of the pneumatic motor 10 can be reduced greatly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pneumatic motor of a pneumatic packing machine, comprising:
    a main body housing having a chamber therein, a circumferential side of the main body housing having an opening, at least one exhaust vent which communicate with the chamber, and a coaxial air inlet, wherein the coaxial air inlet includes at least one air inlet hole, the circumferential side of the main body housing further has an adjustment hole which communicates with the air inlet hole, and an adjustment bolt is threadedly connected in the adjustment hole, so as to adjust the opening of the air inlet hole;
    a pneumatic unit disposed in the chamber of the main body housing, the pneumatic unit comprising a cylinder, the cylinder having a cylinder room therein, a circumferential side of the cylinder having a penetrating hole which communicates with the air inlet hole and the cylinder room and a through hole which communicates with the at least one exhaust vent and the cylinder room, an impeller being pivotally connected in the cylinder room, the impeller having a rotating shaft, one end of the rotating shaft protruding out of the cylinder room and being provided with a driving toothed portion, the rotating shaft comprising a plurality of blades around a circumferential side thereof;
    a first planet gear unit disposed at the opening of the main body housing, the first planet gear unit comprising a first rotating member, one end of the first rotating member having a first connection trough for insertion of the driving toothed portion of the pneumatic unit, another end of the first rotating member being provided with a driven toothed portion, a circumferential side of the first rotating member having at least one first through hole which communicates with the first connection trough, the at least one first through hole being pivotally provided with a first gear, the first gear meshing with the driving toothed portion, a first fixing ring being fitted on the first rotating member, the first fixing ring being fixed to the main body housing, the first fixing ring having a first inner toothed portion on an inner wall thereof, the first inner toothed portion meshing with the first gear, and the at least one exhaust vent surrounding the first planet gear;
    a second planet gear unit connected to the first planet gear unit, the second planet gear unit comprising a second rotating member, one end of the second rotating member having a second connection trough for insertion of the driven toothed portion of the first rotating member, another end of the second rotating member having a toothed trough, a circumferential side of the second rotating member having at least one second through hole which communicates with the second connection trough, the at least one second through hole being pivotally provided with a second gear, the second gear meshing with the driven toothed portion, a second fixing ring being fitted on the second rotating member, the second fixing ring being fixed to the first fixing ring, the second fixing ring having a second inner toothed portion on an inner wall thereof, the second inner toothed portion meshing with the second gear; and
    a transmission member connected to the second planet gear unit, one end of the transmission member having a passive toothed portion, the passive toothed portion being connected to the toothed trough of the second rotating member.

2. The pneumatic motor of a pneumatic packing machine as claimed in claim 1, wherein the circumferential side of the first rotating member has a pair of first through holes, and each of the pair of first through holes is pivotally provided with the first gear.

3. The pneumatic motor of a pneumatic packing machine as claimed in claim 1, wherein the circumferential side of the second rotating member has a pair of second through holes, and each of the pair of second through holes is pivotally provided with the second gear.

* * * * *